Feb. 4, 1958 J. HELLER 2,821,740
HOUSEWARE ARTICLES AND MEANS TO FACILITATE HANDLING THE SAME
Filed Jan. 18, 1956
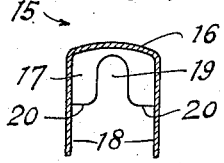
FIG. 7
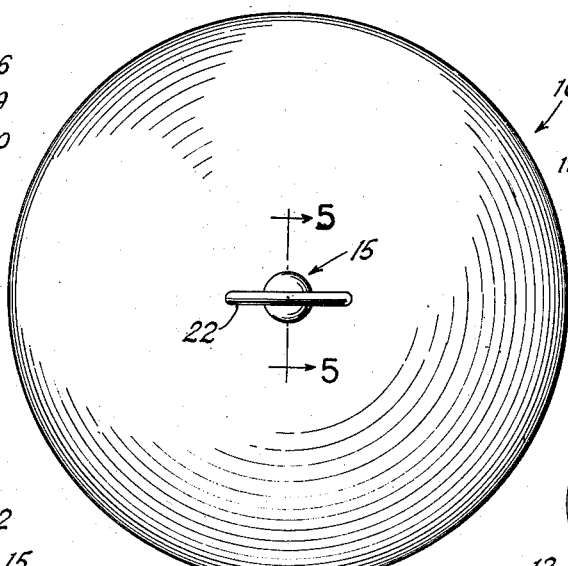
FIG. 1
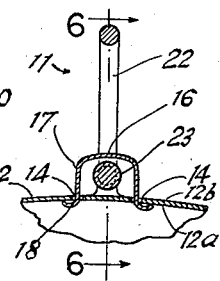
FIG. 5
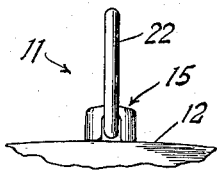
FIG. 4
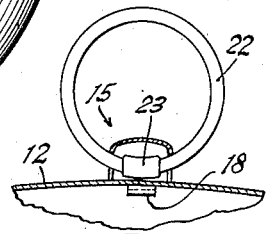
FIG. 6
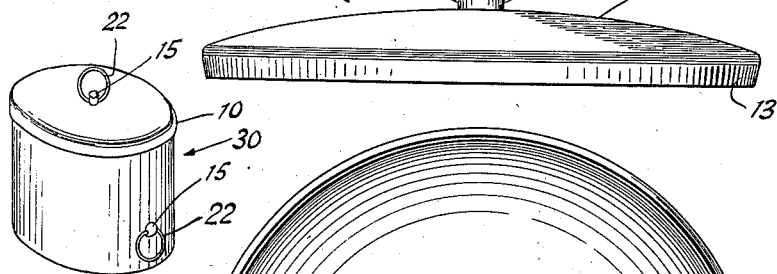
FIG. 2
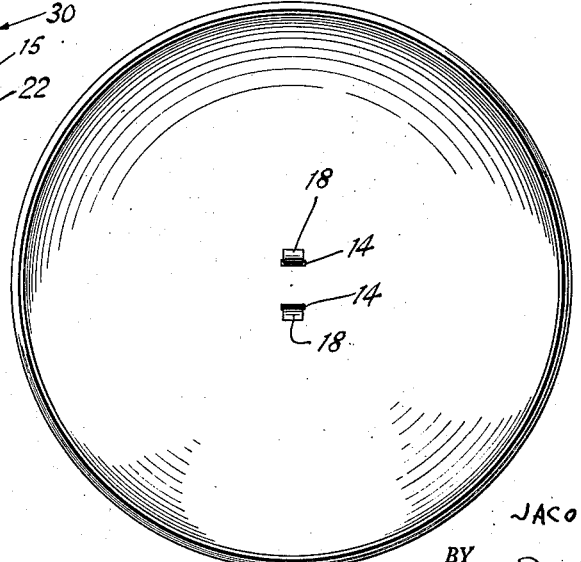
FIG. 8
FIG. 3
INVENTOR.
JACOB HELLER
BY
ATTORNEY United States Patent Office 2,821,740
Patented Feb. 4, 1958

2,821,740

HOUSEWARE ARTICLES AND MEANS TO FACILITATE HANDLING THE SAME

Jacob Heller, White Plains, N. Y., assignor to Heller Hostess-Ware, Inc., White Plains, N. Y., a corporation of New York Application January 18, 1956, Serial No. 559,918

8 Claims. (Cl. 16—127)

This invention relates to houseware articles and means to facilitate handling the same.

An object of this invention is to provide houseware articles, such as canisters, cans, dispensers, bread boxes, and the like articles, having covers or other movable parts, and highly improved means for mounting rings on such houseware articles to facilitate handling the same, or the covers or movable parts thereof.

Another object of this invention is to provide a houseware article provided with a pair of spaced slots, a ferrule having prongs insertable through said spaced slots, said prongs being adapted to be bent back for attaching the ferrule to said houseware article, said ferrule having notches through which a pull ring passes, and said ring having a thickened portion within the ferrule to permit the ring to be swung and yet to prevent the ring from rotating about its axis.

Yet a further object of this invention is to provide a strong, rugged and durable device of the character described, which shall be relatively inexpensive to manufacture, and which shall be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of the invention will be indicated in the appended claims.

In the accompanying drawings in which is shown various illustrative embodiments of this invention;

Fig. 1 is a top plan view of a canister or can cover provided with ring mounting construction embodying the invention;

Fig. 2 is a side elevational view of the structure shown in Fig. 1;

Fig. 3 is a bottom plan view of the structure shown in Figs. 1 and 2;

Fig. 4 is a partial side elevational view of the structure shown in Fig. 2;

Fig. 5 is a cross-sectional view taken on line 5—5 of Fig. 1;

Fig. 6 is a cross-sectional view taken on line 6—6 of Fig. 5;

Fig. 7 is a cross-sectional view of the ferrule shown in Fig. 5 before the prongs are bent back; and Fig. 8 is a perspective view of a canister provided with a cover and provided with handling ring construction embodying the invention on the cover and on the body of the canister.

Referring now in detail to the drawing, 10 designates a canister or can cover provided with ring structure 11 embodying the invention. The cover 10 is shown by way of illustration, since the ring structure embodying the invention may be applied not only to can or canister covers, but to the bodies of cans, to movable parts of a bread box, or dispenser of aluminum foil, wax paper, or paper towels, or to other houseware or kitchen receptacles or articles.

The cover 10 comprises a rounded top wall 12 formed at its outer end with a somewhat inwardly and downwardly tapered annular flange or skirt 13. The top wall 12 is formed with a pair of spaced parallel slots 14 on opposite sides of the center of the cover.

Mounted on the cover is a hollow knob or ferrule 15. Said ferrule may be made of stamped and drawn sheet metal or of other suitable material. The ferrule 15 has a top wall 16 from which extends a cylindrical wall or skirt 17.

Extending down from the cylindrical wall 17 are a pair of opposite prongs 18. The cylindrical wall 17 is formed with a pair of opposed notches 19 extending upwardly from lower edges 20. It will be noted that the prongs 18 extend down below the lower edges 20. The prongs 19, furthermore, are disposed between said notches 19. The upper ends of the notches 19 terminate below the top wall 16. The prongs 18 pass through the slots 14 and are bent outwardly, as shown in Fig. 5, against the under surface 12a of wall 12. The edges 20 rest on the upper surface 12b.

Extending through the ferrule, and passing through the notches 19, is a pull ring 22. The ring 22 may be made of plastic, metal, or any other suitable material. It is formed with a thickened collar portion 23 wholly received within the ferrule. The thickened portion 23 is of greater diameter than the width of the notches 19, so that the ring 22 cannot be rotated about its axis. However, the ring can swing down against the top wall 12 of the cover.

In Fig. 8 there is shown a canister 30 comprising a body or receptacle 31 which may be covered by a cover 10, such as shown in Fig. 1. The cover 10 is provided with the ferrule 15 and ring 22, described hereinabove. The body 31 of the canister may also be provided with a ferrule 15 supporting a ring 22, as in Fig. 8. To this end, the body 31 is formed with slots to receive the prongs 18. Thus, one ring 22 is provided for the cover to facilitate lifting of the cover, and one ring is provided for the body of the canister to facilitate pulling the canister off the shelf.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described the invention in some detail, I claim as new and desire to secure by Letters Patent:

1. In combination, an article having a wall formed with a pair of spaced parallel slots, a ferrule applied to the outer surface of said wall and comprising a hollow member having a top wall, and an annular skirt extending from the top wall, and prongs extending from the annular skirt, said prongs passing through said spaced slots and extending at an angle to the skirt and engaging the inner surface of said wall of said article, said annular skirt having edges contacting the outer surface of said wall of said article and being formed with a pair of opposite notches extending from said edges, and a closed ring passing through the notches and rotatably mounted on said ferrule about the portion of the ring within the ferrule.

2. The combination of claim 1, said ring having a thickened collar portion disposed within said ferrule and between said notches and being of greater diameter than the width of said notches to retain the ring against rotation about its axis.

3. The combination of claim 2, said notches terminating below the top wall of said ferrule.

4. A can cover having a top curved wall, said cover being formed at opposite sides of the center thereof with a pair of spaced slots, a ferrule made of hollow sheet metal and comprising a top wall spaced above the top wall of said cover, an annular skirt extending downwardly from the top wall of said ferrule and having lower edges contacting the upper surface of the top wall of the cover, and prongs extending from said annular skirt and passing through said slots and bent at an angle to the skirt and engaging the underside of said top wall on said cover; said skirt being formed with notches extending upwardly from the lower edges thereof, and an annular closed ring passing through said notches and swingably mounted on said ferrule.

5. The ocmbination of claim 4, said notches being disposed at right angles to said prongs.

6. The combination of claim 5, said ring being formed with a thickened collar portion disposed within said ferrule and between said notches and being thicker than the notches to prevent rotation of the ring about its axis.

7. The combination of claim 6, said notches terminating below the top wall of the ferrule.

8. The combination of claim 3, said notches being located between said prongs.

References Cited in the file of this patent

UNITED STATES PATENTS

| | | |
|---|---|---|
| D. 176,019 | Hollwell | Nov. 8, 1955 |
| 298,371 | Graver | May 13, 1884 |
| 414,867 | Moffett | Nov. 12, 1889 |
| 498,020 | Murray | May 23, 1893 |
| 2,114,137 | Conner | Apr. 12, 1938 |